US009111170B2

(12) United States Patent
Tsai et al.

(10) Patent No.: US 9,111,170 B2
(45) Date of Patent: Aug. 18, 2015

(54) METHODS AND APPARATUS RELATING TO TEXT ITEMS IN IMAGES

(71) Applicant: BLACKBERRY LIMITED, Waterloo (CA)

(72) Inventors: Wade Tsai, Seattle, WA (US); David Michael Sutton, Seattle, WA (US); Jean-Francois Desgagne, Seattle, WA (US); Ryan William Josal, Seattle, WA (US)

(73) Assignee: BlackBerry Limited, Waterloo, Ontario (CA)

(*) Notice: Subject to any disclaimer, the term of this patent is extended or adjusted under 35 U.S.C. 154(b) by 0 days.

(21) Appl. No.: 14/091,195

(22) Filed: Nov. 26, 2013

(65) Prior Publication Data

US 2015/0146982 A1    May 28, 2015

(51) Int. Cl.
*G06K 9/34* (2006.01)
*G06F 3/048* (2013.01)

(52) U.S. Cl.
CPC ............... *G06K 9/344* (2013.01); *G06F 3/048* (2013.01); *G06K 2209/01* (2013.01)

(58) Field of Classification Search
USPC .......... 382/177, 176, 312, 318, 319; 235/383; 348/150, 570; 1/1; 704/2, 3, 7; 705/7.11, 7.42, 325; 715/711, 808, 715/715, 765, 835, 704
See application file for complete search history.

(56) References Cited

U.S. PATENT DOCUMENTS

| | | | |
|---|---|---|---|
| 7,992,085 B2 * | 8/2011 | Wang-Aryattanwanich et al. | 715/711 |
| 8,570,375 B1 * | 10/2013 | Srinivasan et al. | 348/150 |
| 8,594,482 B2 * | 11/2013 | Fan et al. | 386/200 |
| 8,606,607 B2 * | 12/2013 | Torres-Rocca et al. | 705/7.11 |

* cited by examiner

*Primary Examiner* — Anh Do
(74) *Attorney, Agent, or Firm* — Jon Gibbons; Fleit Gibbons Gutman Bongini & Bianco P.L.

(57) ABSTRACT

A method and an electronic device are provided for obtaining an image or a video frame, including applying to the image or the video frame, at least one image processing technique, scanning the image or the video frame, to identify a text item, determining an item type for the identified text item, and determining an action, corresponding to the item type.

21 Claims, 12 Drawing Sheets

METHODS AND APPARATUS RELATING TO TEXT ITEMS IN IMAGES

TECHNICAL FIELD

The following relates generally to methods and apparatus relating to text items in images and in particular to performing, by an electronic device, an action relating to text scanned by the electronic device.

BACKGROUND

Many electronic devices, including mobile devices, include a camera in which an image or video can be captured and an optical character recognition application in which text is determined from an image or a video. The inventors have identified that it would be useful for an electronic device to perform an action in relation to text determined from an image or a video.

BRIEF DESCRIPTION OF THE DRAWINGS

Example embodiments will now be described by way of example only with reference to the appended drawings wherein:

FIG. 1-4 illustrate a system configured to perform an action based on text determined in an image or video scanned by an electronic device, according to an example embodiment.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practised without these specific details. In other instances, well-known methods, procedures and components have not been described in detail so as not to obscure the example embodiments described herein. Also, the description is not to be considered as limiting the scope of the example embodiments described herein.

FIGS. 1-4, illustrate a system configured to perform an action based on text determined in an image or video scanned by an electronic device 110, according to an example embodiment. The electronic device 110 is optionally communicatively connected to a natural language processing server 120.

Figure 1:
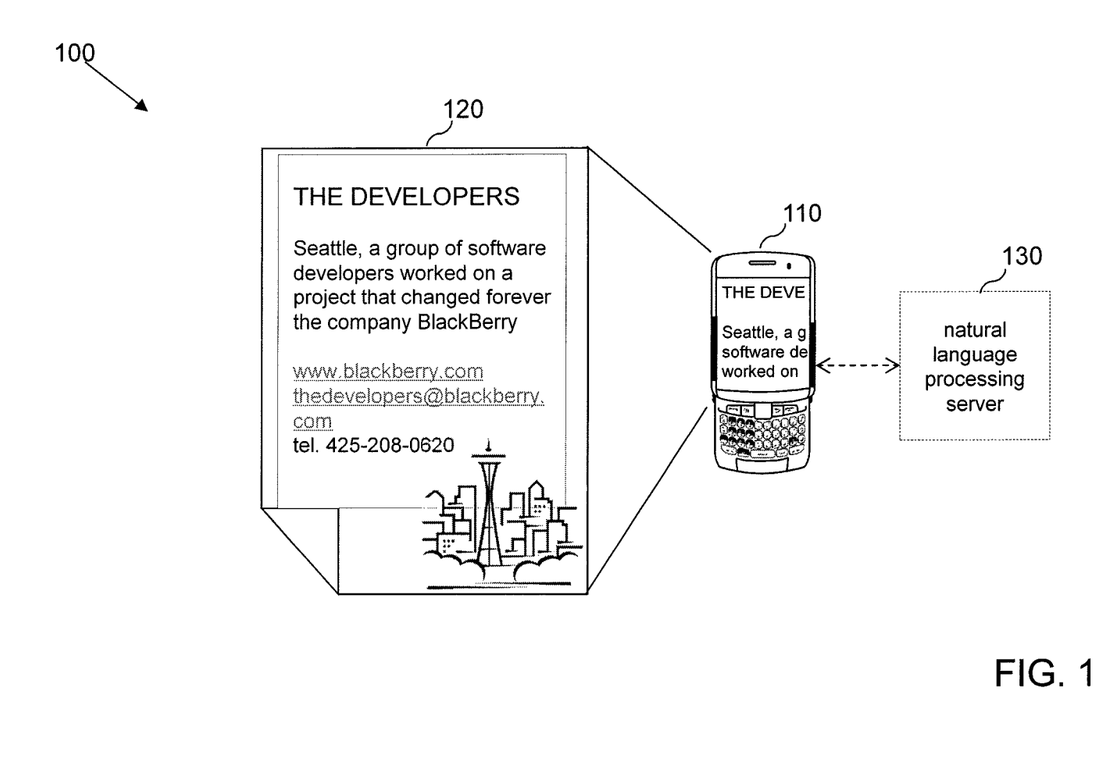

The device 110 includes a camera, which captures an image of poster 120. The camera is also configured to capture a frame of a video. It can be appreciated that the following principles also apply to images that are received, accessed from storage, or otherwise obtained by the device 110. The device 110 temporarily stores the image or video frame in a buffer of the camera, so that the device 110 can further process the image or video frame.

Device 110 applies to the image or video frame, image processing techniques, to enhance recognition of text items in the image or video frame. Through an image processing technique called thresholding (a technique that is known to one skilled in the art), the device 110 boosts the contrast in the image or video frame, to bring out potential text items. In an example embodiment, the image processing techniques may be performed by image processing software (1141 of FIG. 11) of device 110, such as for example, Leptonica software, which is integrated into the Tesseract software suite.

Figure 2:
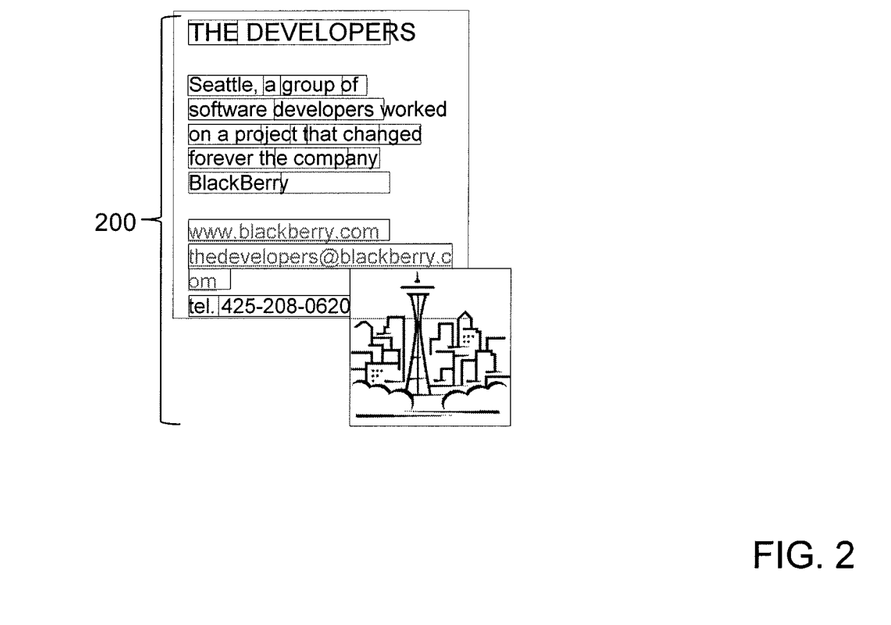
FIG. 2 illustrates rectangles drawn by an electronic device, according to an example embodiment.

As illustrated in FIG. 2, the device 110 detects edges of potential text items and draws rectangles 200 (or squares, or other boundary defining shapes) around the potential text items that are to be later scanned for text. By drawing the rectangles, only specific areas within the image will be scanned. In an example embodiment, the detection of edges of potential text items may be performed by image processing software (1141 of FIG. 11) of device 110, such as for example, OpenCV software. Example alternatives to OpenCV include, without limitation, FastCV (open source), LibCCV (open source), and Dacuda (commercially available).

Optionally, as an optimization step, the device 110 determines the boundaries of each rectangle and combines overlapping rectangles into larger rectangles to reduce the amount of fragmented text spans, Since the number of rectangles to be scanned would be reduced, scanning performance would be improved.

The device 110 scans each of the rectangles 200, to identify any text items that may be in the rectangle. A text item can be defined as having at least one character (including alphabetic characters, characters specific to a foreign language, numbers, symbols (e.g., stock symbols) and spaces). As a text item can be at least one character, a text item can include a single character, a word or multiple words. In an example embodiment, the detection of edges of potential text items may be performed by character recognition software (1142 of FIG. 11) of device 110, such as optical character recognition software, such as for example, Tesseract software. Example alternatives to Tesseract include, without limitation, Abbyy (commercially available), OCR Shop XTR (commercially available), Ocropus (open source), and Cuneiform (open source).

Sometimes scanning is not optimally performed, typically due to poor lighting conditions when a scan is performed. As a result, items can be misidentified as text items or identified text items are misspelled.

To improve scanning performance, optional methods may be used. For example, any misspelled text items may be corrected. The Levenshtein distance algorithm (which is known to one skilled in the art) for example, can be used to determine how similar the misspelled text item is to a word that has the correct spelling. If, after using the algorithm, the distance is small (or in other words the misspelled text item is similar to a word that has the correct spelling), the word with the correct spelling is used instead of the identified text item.

Another optional method to improve scanning performance is assigning a confidence level to a scan of a rectangle and any scans with a low confidence level are discarded.

Another optional method to improve scanning performance is to apply rules to discard identified text items that do not meet predetermined criteria. Example rules, which can be applied, are to discard the identified text item due to it not meeting such predetermined criteria are, if:
1) The word is too long, e.g. 20 characters long.
2) The word contains 3 or more identical characters
3) The word contains more punctuation than alphanumeric characters
4) The word contains three or more different punctuation characters (ignoring first and last characters)
5) The word contains five or more consecutive vowels or consonants (with exceptions)
6) The word contain more uppercase letters than lowercase letters (unless the word is all uppercase)
7) The word is a single letter that is not 'a' or 'l'
8) The word contains only alphabetical characters and has 8 times more vowels than consonants (or vice versa)

After any discarding of any items misidentified as text items, or correcting any misspelled identified text items, the device 110 determines an item type for at least some of the identified text items. An item type can be defined as a type or characterization of the text item and can include and is not limited to for example: a communication address (e.g. a phone number, an email address, an electronic device identification (e.g. a BlackBerry personal identification number (PIN)), an instant message address and a social networking (e.g. Twitter) address), a location, a name (e.g. of a person, organization, product, service, location, movie, entertainer, bus route), an element of calendar (e.g. a year, a month, a date and a time), an element of social networking (e.g. Twitter) topic, a uniform resource locator (URL) and a shipping tracking number, UPC codes, bar codes, QR codes, ASINs (Amazon product ids), item part/stock numbers, stock symbols, etc. The device can determine some item types (e.g. a communication address, an element of a calendar, an element of social networking, a URL and a shipping tracking number) by attempting to match a text item with a with predefined pattern, such as in regular expression pattern matching (which is known to one skilled in the art).

The device 110 also determines at least one action, corresponding to an item type of a text item.

Alternatively, the device 110 sends at least some of the identified text items to a natural language processing server 130 (of FIG. 1) that is communicatively connected to the device. The device 110 may do this in the case where it cannot determine an item type for a particular text item. The server 130 determines an item type for at least some of the identified text items.

In an example embodiment, the server 130 determines the item types by using context surrounding or near the particular text item. For example, the server 130 receives from the device 110 the text items identified in the rectangles 200 of FIG. 2. When processing the "BlackBerry" text item for example, the server looks at the text items occurring before and/or after the "BlackBerry" text item. For example, the server reviews the text items in sentence containing the "BlackBerry" text item. In another example, the server looks at a predetermined number of text items occurring before and/or after the "BlackBerry" text item. In either of these examples, the server 130 looks at the "company" text item, occurring before the "BlackBerry" text item and can determine that "BlackBerry" relates to the item type of a name company. In another example embodiment, the device 110 similarly determines the item types by using context surrounding or near the particular text item.

In another example embodiment, the server 130 is populated with various information and databases, which it uses to determine an item type for a text item. Example information and databases are: a business names database, a white list of known data, Wikipedia data, a TV and movie database (e.g. the Internet Movie Database), and a database of artists and entertainers. For example, when processing the "Seattle" text item identified in the rectangles 200 of FIG. 2, the server uses Wikipedia data to determine that "Seattle" relates to the item type of a location. In another example embodiment, the device 110 is populated with the various information and databases, which it uses to determine an item type for a text item.

The server 130 also determines at least one action, corresponding to the item type, and sends the determined actions to the device 110.

Figure 3:
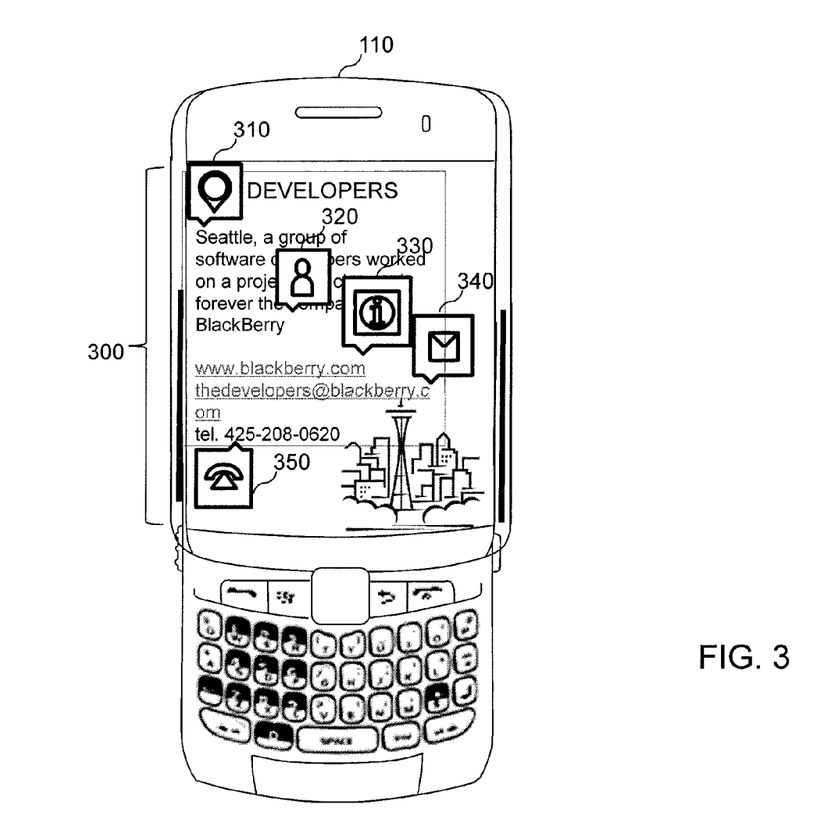
FIG. 3 illustrates an electronic device, displaying in its display, selectable icons, each of the icons corresponding to an action corresponding to an item type of a text item, according to an example embodiment.
Figure 4:
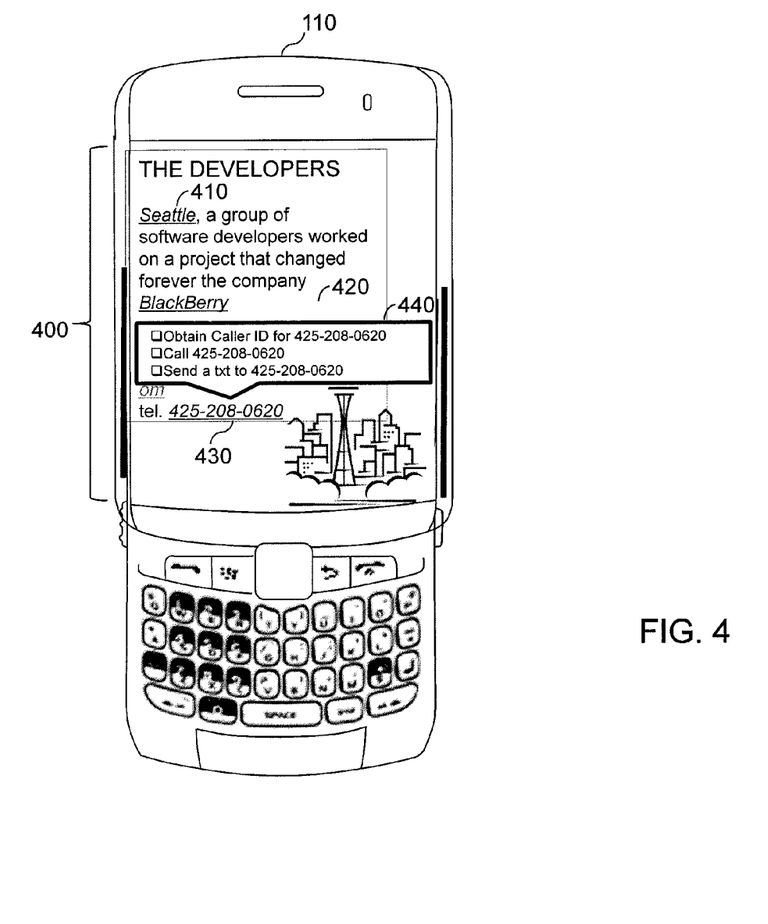
FIG. 4 illustrates an electronic device, displaying in its display, text items and a menu of selectable actions, corresponding to an item type of a text item, according to an example embodiment.

The device 110 provides a user interface to allow a user to select an action corresponding to an item type of a text item. FIGS. 3 and 4 illustrate these user interfaces, according to example embodiments.

FIG. 3 illustrates the device 110, displaying in its display 300, user interface elements that are selectable icons 310, 320, 330, 340 and 350, each of the icons corresponding to an action corresponding to an item type of a text item, according to an example embodiment. The selectable icons are displayed adjacent to or near to the corresponding text item and include an arrow pointing to the corresponding text item. For example, icon 310 is near to and points to text item "Seattle", icon 320 is near to and points to text item "BlackBerry", icon 330 is near to and points to text item "www.blackberry.com", icon 340 is near to and points to text item "the developers@blackberry.com" and icon 350 is near to and points to text item "425-208-0620"

Icon 310 is a mapping icon, corresponding to a location item type, for the text item "Seattle". Upon receiving selection of icon 310, device 110 can e.g. display Seattle in a map in a map application (1038 of FIG. 10) of device 110.

Icon 320 is a contact icon, corresponding to a name item type for the text item "BlackBerry". Upon receiving selection of icon 320, device 110, can e.g. create a contact entry, with "BlackBerry" for the contact name, in a Personal Information Manager (PIM) application (1040 of FIG. 10) of device 110.

Icon 330 is an information icon, corresponding to a URL item type, for the text item "www.blackberry.com". Upon receiving selection of icon 330, device 110 can e.g. launch a web browser of device 110, with the URL "www.blackberry.com", Icon 340 is a messaging icon, corresponding to the communication address item type, for the text item "thedevelopers@blackberry.com". Icon 350 is a phone icon, corresponding to the phone number item type, for the text item "425-208-0620". Upon receiving selection of icon 340, device 110 can e.g. call the phone number "425-208-0620".

FIG. 4 illustrates another user interface to allow a user to select an action corresponding to an item type of a text item. Specifically, FIG. 4 illustrates the device 110, displaying in its display 400, text items 410 and 430, and a user interface element that is a menu 440 of selectable actions, corresponding to an item type of a text item, according to an example embodiment. Menu 440 is near to and points to text item 430.

In this example embodiment, text items 410, 420 and 430 are shown in the form of user interface elements of italics and underlined text. (In other example embodiments, the text items can be shown in the form of other user interface elements, such as highlighted text.) Text items 410, 420 and 430 are also hyperlinked, such that upon the device 110 receiving selection of one of the text items, the device displays a menu of selectable actions, corresponding to the item type of the text item. For example, upon receiving selection of text item 430 (which is phone number "425-208-0620"), menu 440 is displayed, providing the selectable actions: "Obtain Caller ID for 425-208-0620", "Call 425-208-0620" and "Send a txt to 425-208-0620".

In another example embodiment, upon selection of one of the hyperlinked text items 410, 420 and 430, the device performs a default action. For example, upon the device 110 receiving selection of the "Seattle" text item 410, the device performs a default action of displaying Seattle in a map application (1039 of FIG. 10) of the device.

Table 1 below lists actions that can be performed by the device 110, corresponding to particular text types of text items, according to example embodiments. The actions can be performed in response to selection of a particular text item having a text type, or selection of a user interface element (e.g. icon, hyperlink, menu item and radio button) associated with a particular text item.

TABLE 1

| Text Type | Example Actions That Can Be Performed by the Electronic Device |
|---|---|
| Phone number | Obtain the caller ID for the phone number |
| | Call the phone number |
| | Send a text message to the phone number |
| | Create a contact in the electronic device's PIM application with the phone number |
| Email address | Send an email to the email address |
| | Look up the email address in the electronic device's PIM application, to find the corresponding contact |
| | Create a contact in the electronic device's PIM application with the email address |
| Electronic device identification (e.g. BlackBerry PIN) | Create a contact in the electronic device's PIM application with the electronic device identification |
| | Initiate a communication with the electronic device associated with the electronic device identification |
| Name of a person | Create a contact in the electronic device's PIM application with the person's name |
| | Launch a web browser or app of the electronic device, to look up the person's name in e.g. Google, Wikipedia, LinkedIn, or Facebook |
| | View the electronic device's PIM application entry associated with the person's name |
| | Call, email, send a text message, or send an instant message to the contact associated with the person's name |
| Date or time | Add an entry in the electronic device's calendar, with the date or time. |
| | Include in an entry in the electronic device's |

TABLE 1-continued

| Text Type | Example Actions That Can Be Performed by the Electronic Device |
|---|---|
| | calendar, contextual information in the text item that includes the date or time |
| | Add a reminder in a reminder application at a user-specified period ahead of the date or time |
| Name of an organization | Create a contact in the electronic device's PIM application with the organization's name |
| | Launch a web browser application of the electronic device, with the web site of the organization |
| | Sign up for offers, offered by the organization |
| | Obtain information about the organization, using a service (e.g. Yelp, Open Table) |
| | Obtain deals offered by the organization, using a service (e.g. Groupon) |
| | Launch a web browser or app of the electronic device, to look up the organization in e.g. Google, Wikipedia, LinkedIn, or Facebook |
| Name of a product | Sign up for offers regarding the product |
| | Locate a nearby store that carries the product |
| | Launch a web browser or app of the electronic device, to look up the product in e.g. Google, Wikipedia, Wolfram Alpha |
| Name of a service | Locate nearby providers of the service |
| Name of a movie or entertainer | Find show times |
| | Order tickets |
| | Look up reviews |
| Name of a bus route | Look up the schedule associated with the bus route. |
| Social networking (e.g. Twitter) topic | Launch a web browser or app of the electronic device, to search for the topic in the social networking web page or app |
| Social networking (e.g. Twitter) address | Launch a web browser with the social networking web page or the social networking app, to follow the person associated with the address |
| URL | Launch a web browser with the URL |
| Location | View the location in a map application of the device |
| | Get directions to the location using a map application of the device |
| Shipping tracking number | Launch a web browser (with the shipper's web page) or the shipper's app, to look up the status of the shipment associated with the shipping tracking number |

Figure 5:
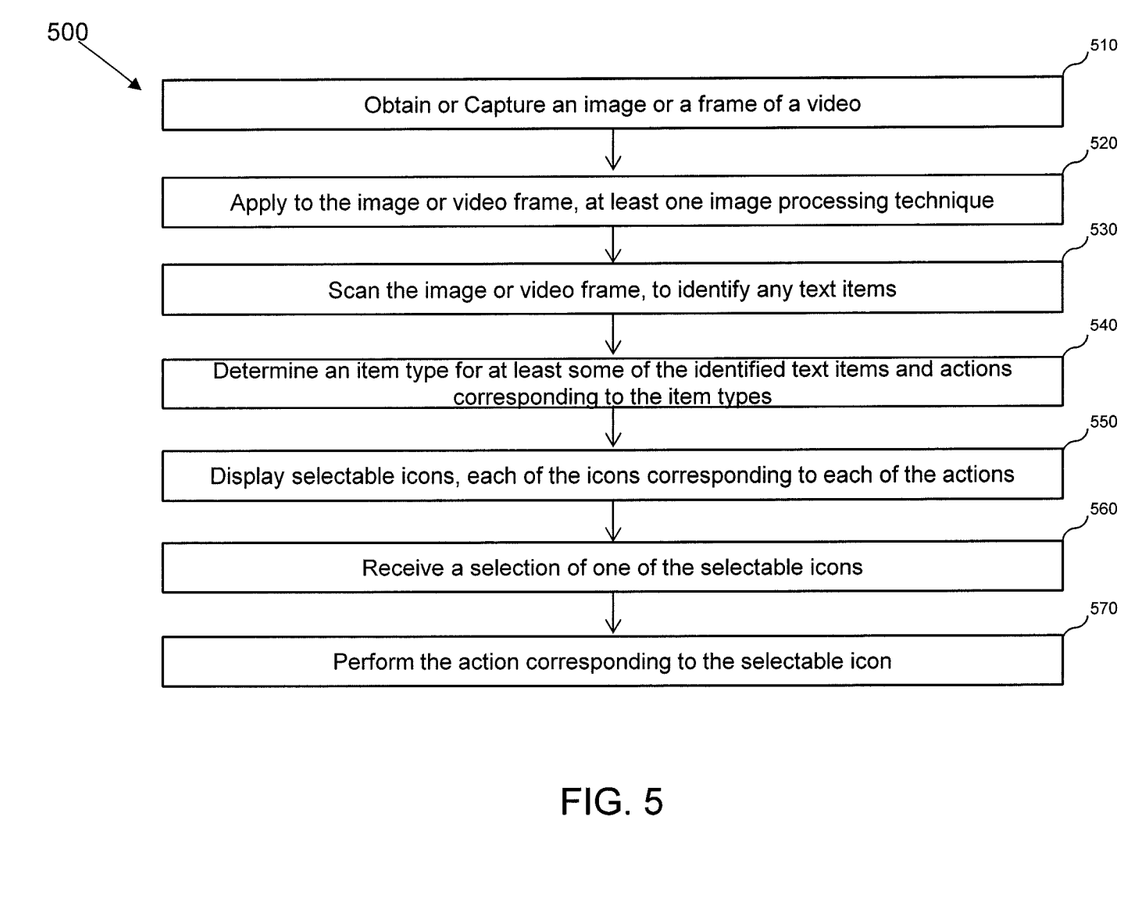
FIG. 5 is a flow diagram of processor or computer executable instructions for an electronic device to perform an action based on scanned text, according to an example embodiment.

FIG. 5 is a flow diagram of processor or computer executable instructions of a method 500 for device 110 to perform an action based on scanned text, according to an example embodiment. (Additional details of method 500 are discussed in the discussion of FIGS. 1-4.) At 510, an image of a frame or a video is captured. At 520, at least one image processing technique is applied to the image or video frame. (Details of image processing techniques, according to an example embodiment, are discussed in the discussion of FIG. 6.) At 530, the image or video frame is scanned to identify any text items. (In an example embodiment, rectangles around potential text items in the image or video frame, are determined from the image processing techniques of FIG. 6. These rectangles are scanned to identify any text items. Further processing of the rectangles, is discussed in the discussion of FIG. 7.) At 540, an item type is determined for at least some of the identified text items. Furthermore, actions corresponding to the item types are determined. At 550, selectable icons are displayed. Each of the icons corresponds to each of the actions determined at block 540. At 560, a selection of one of the selectable icons is received at device 110. At 570, the device 110 performs the action corresponding to the selectable icon received at 560.

In the case where the device captures a frame of a video (in 510), 510-570 can be repeated by the device, for subsequent frames of the video captured by the device. By repeating 510-570 for each frame of a video, the device performs real-time processing of any text items in the video frames.

Figure 6:
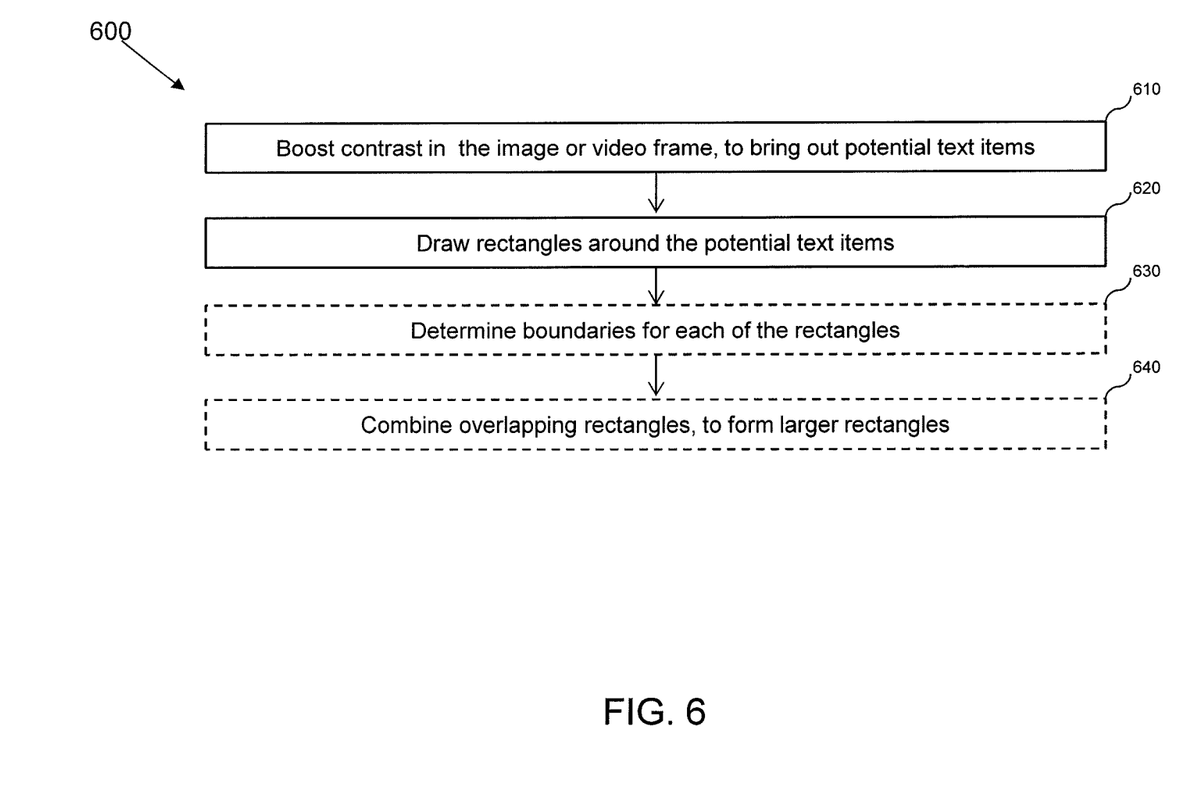
FIG. 6 is a flow diagram of processor or computer executable instructions for an electronic device to perform image processing, according to an example embodiment.

FIG. 6 is a flow diagram of processor or computer executable instructions of a method 600 for device 110 to perform image processing, according to an example embodiment. (Additional details of method 600 are discussed in the discussion of FIG. 2.) At 610, the contrast of the image or video frame is boosted, to bring out potential text items. At 620, the device draws rectangles around the potential text items. 630 and 640 may be optionally performed by the device. At 630, the device determines boundaries of each of the rectangles. At 640, the device combines overlapping rectangles, to form larger rectangles.

Figure 7:
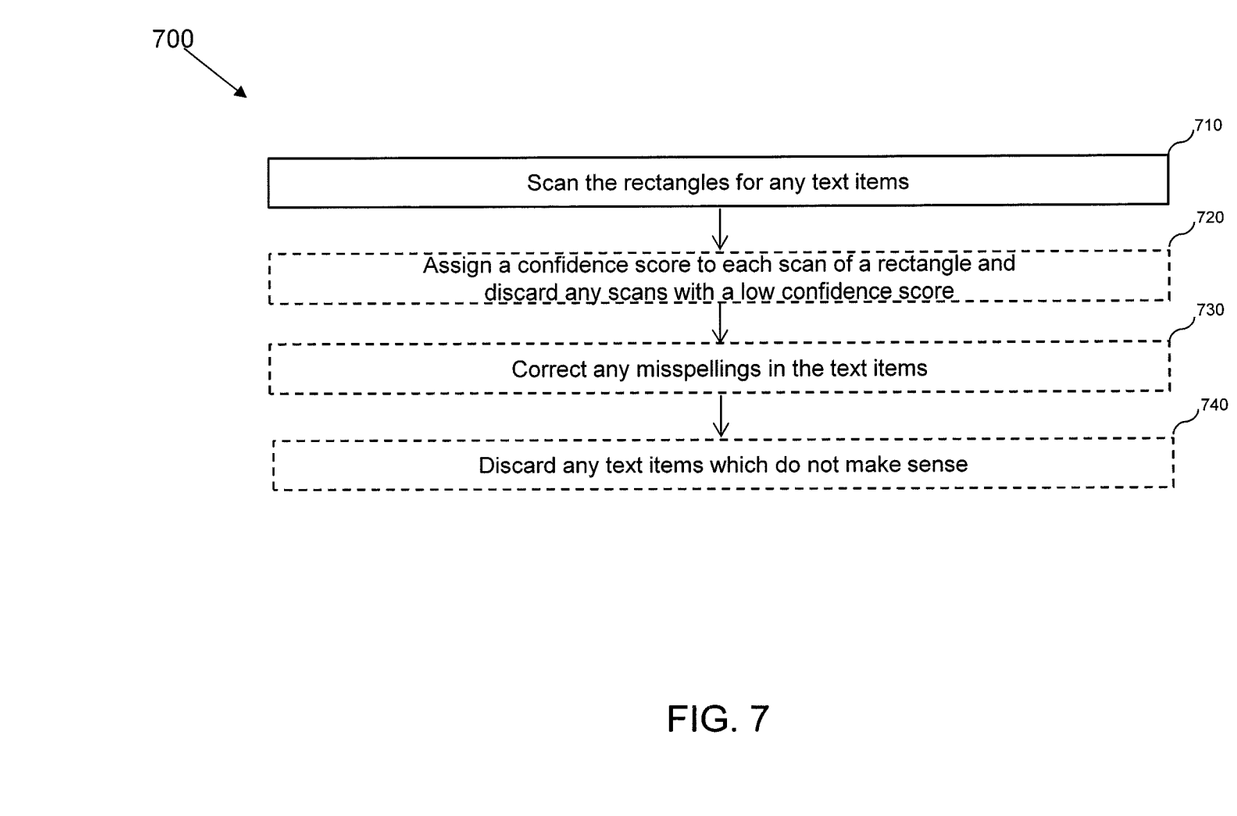
FIG. 7 is a flow diagram of processor or computer executable instructions for an electronic device to perform scanning, according to an example embodiment.

FIG. 7 is a flow diagram of processor or computer executable instructions 700 for a method for device 110 to scan and process the rectangles around potential text items in the image or video frame, which were determined from the image processing techniques of FIG. 6, according to an example embodiment. (Additional details of method 700 are discussed in the discussion of FIG. 2.) At 710, the rectangles are scanned for any text items. 720, 730 and 740 may be optionally performed by the device. At 720, the device assigns a confidence score to each scan of a rectangle. Furthermore, the device discards any scans with a low confidence score. At 730, the device corrects any misspellings in the text items. At 740, the device discards any text items which do not meet predetermined criteria, e.g. such that they do not make sense.

Figure 8:
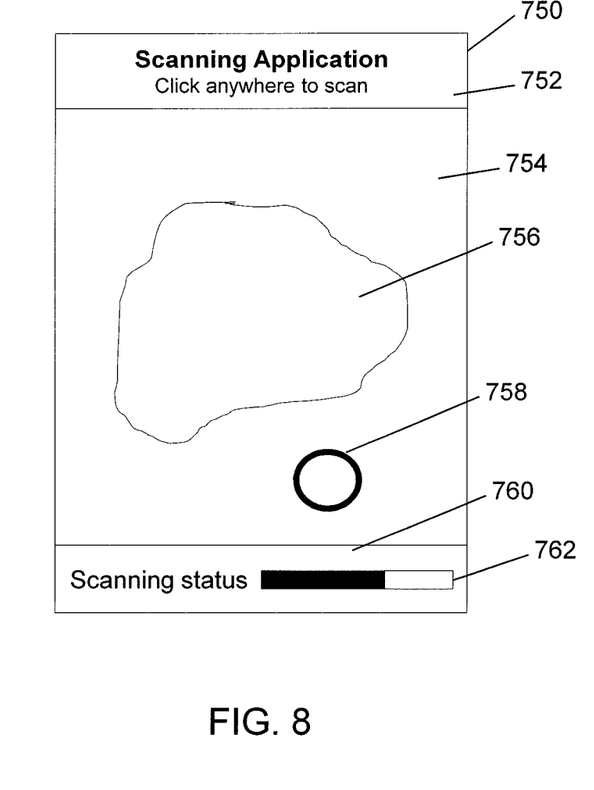
FIG. 8 is a screen shot of an example of a user interface for a scanning application during a scanning operation.
Figure 9:
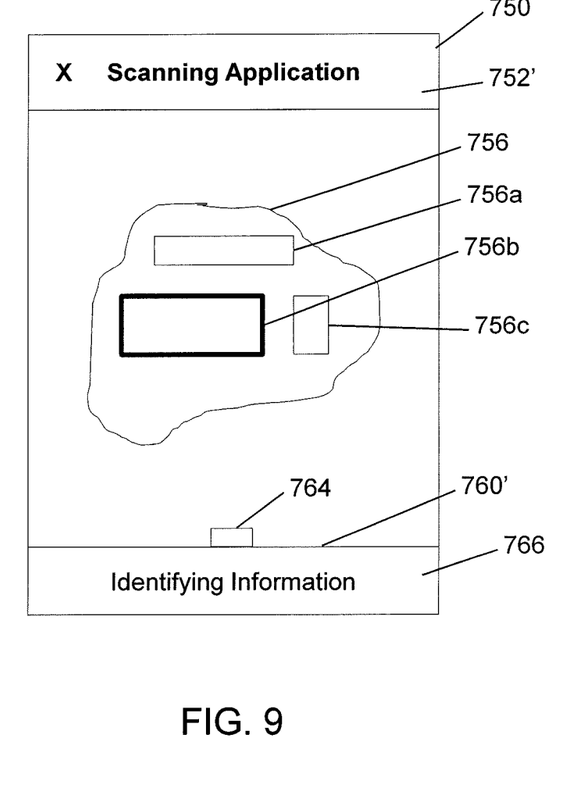
FIG. 9 is a screen shot of an example of a user interface for a scanning application subsequent to a scanning operation.
Figure 16:
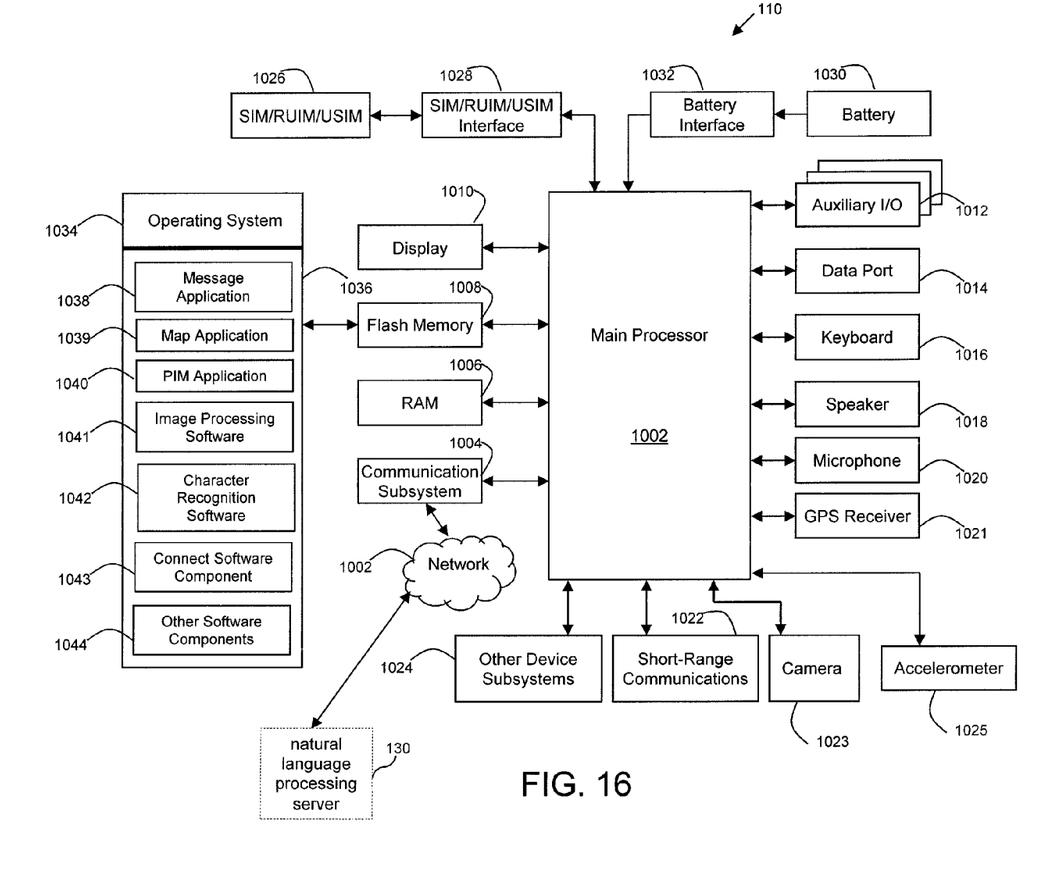
FIG. 16 is a block diagram of an electronic device, according to an example embodiment.

FIGS. 8-13 illustrate an example user interface workflow for an application utilizing the image processing software 1041 and/or the character recognition software 1042 (see also FIG. 16). FIG. 8 illustrates an example screen shot of a scanning application 750, which includes a header 752 indicating that content 756 visible within a viewing portion 754 may be scanned by applying an input to the viewing portion 754, by "clicking anywhere to scan". In this example, when the content 756 becomes visible within the viewing portion 754, a touch input 758 triggers or otherwise initiates a scanning of the content 756, e.g. as discussed above, in order to identify text items 756*a*, 756*b*, 756*c* as shown in FIG. 9. FIG. 8 also illustrates a footer 760 that may provide a status bar 762 during a scanning/analysis process.

Figure 10:
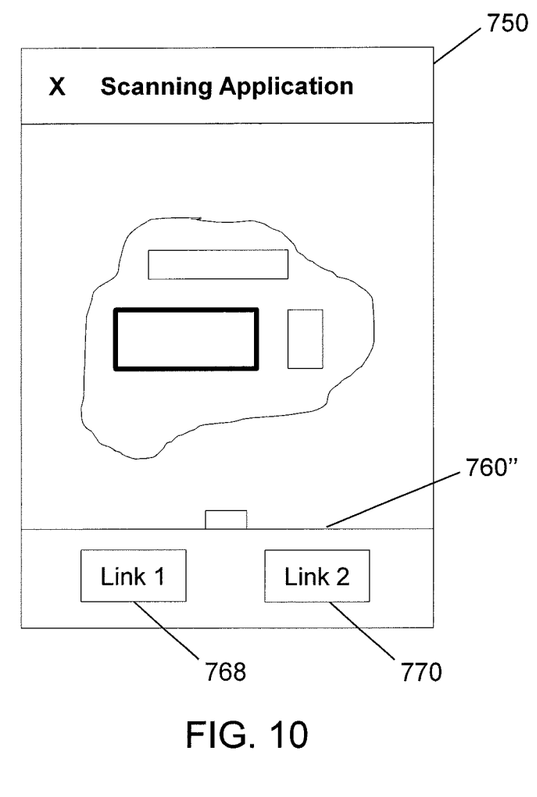
FIG. 10 is a screen shot of a user interface for a scanning application subsequent to a scanning operation and displaying links associated with content determined during the scanning operation.

Once the scanning is complete, the text items 756*a*, 756*b*, 756*c* may be highlighted, tagged or otherwise identified as shown in FIG. 9. In the example shown in FIG. 9, a selected text item 756*b* can have corresponding identifying information 766 displayed in an updated footer 760'. A tab 764 may also be provided to enable an interaction with the footer 760', e.g., to expand the size of the footer 760' to generate a further modified footer 760" as shown in FIG. 10. In this way, additional information such as links to other applications can be displayed. In FIG. 10, a first link "Link 1" 768 and a second link "Link 2" are displayed, each being associated with another application. This allows, for example, a detected phone number to initiate either a voice call, or a text message. Similarly, a link can be generated that launches a search engine to perform a web-based search. The web-search link may be advantageous for text items that cannot be associated with a particular application, e.g. general text.

Figure 11:
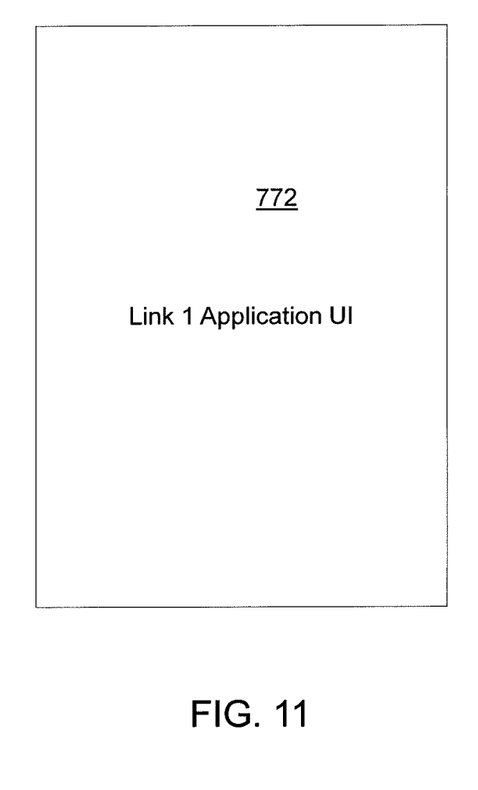
FIG. 11 is a screen shot of a user interface for a linked application.
Figure 12:
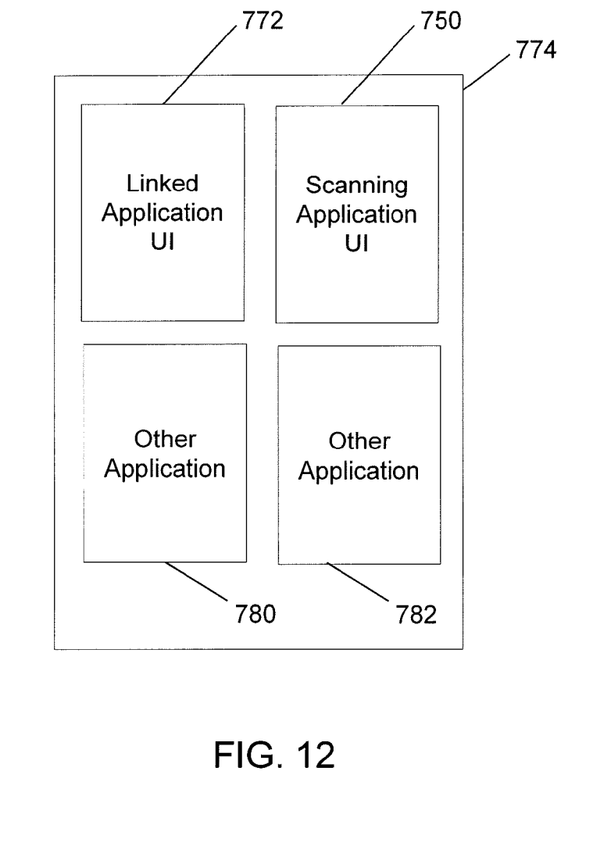
FIG. 12 is a screen shot of a user interface for a tiled collection of active applications.
Figure 13:
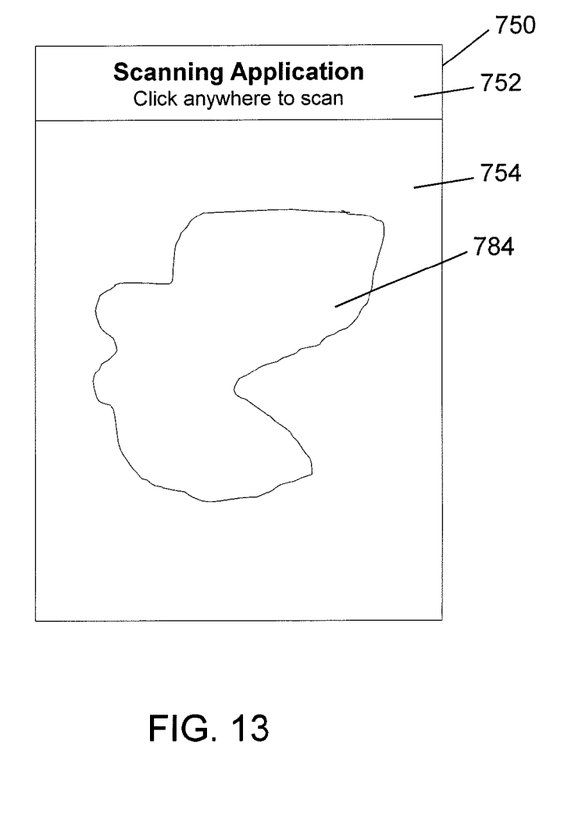
FIG. 13 is a screen shot of an example of a user interface for a scanning application prior to a scanning operation.

FIG. 11 illustrates an application UI 772 for an application associated with Link 1, which can be initiated by selecting the link 768 shown in FIG. 10. It can be appreciated that the links displayed in the footer 760" enable convenient navigation to other applications to perform an action based on the detected text item. FIG. 12 illustrates a further navigation to a "tiled" user interface showing multiple open applications, including the linked application UI 772, the scanning application UI 750, and in this example two other applications 780, 782. After interacting with the linked application UI 772 as shown in FIG. 11, the scanning application UI 750 may be selected from the screen 774 shown in FIG. 12 to navigate back to the scanning application UI 750 to begin another scan, e.g., for new content 784 visible in the viewing portion 754.

Examples of applicable electronic devices may include, without limitation, cellular phones, smart-phones, tablet computers, pagers, wireless organizers, personal digital assistants, computers, laptops, handheld wireless communication devices, wirelessly enabled notebook computers, portable gaming devices, and the like. Such devices will hereinafter be commonly referred to as "electronic devices" 110 for the sake of clarity. It will however be appreciated that the principles described herein are also suitable to other electronic devices, not listed here.

In an example embodiment, the electronic device 110 can be a two-way communication device with advanced data communication capabilities including the capability to communicate with other electronic devices or computer systems through a network of transceiver stations. The electronic device may also have the capability to allow voice communication. Depending on the functionality provided by the electronic device, it may be referred to as a data messaging device, a two-way pager, a cellular telephone with data messaging capabilities, a wireless Internet appliance, or a data communication device (with or without telephony capabilities).

Figure 14:
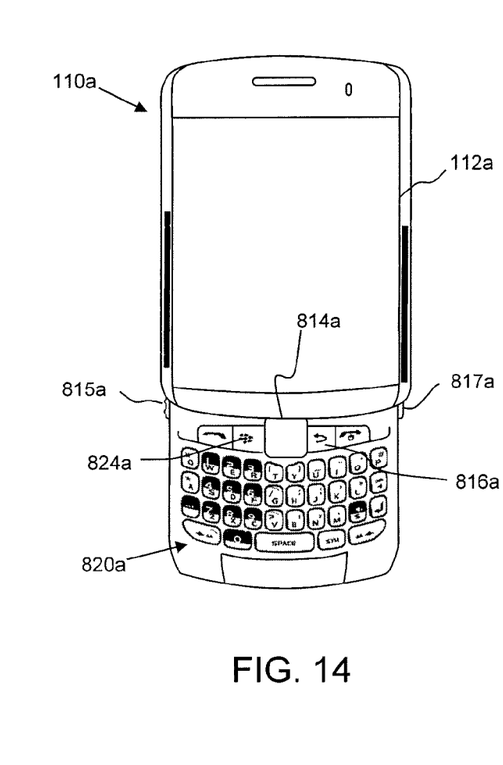
FIGS. 14-15 are plan views of electronic devices and display screens therefor, according to example embodiments.
Figure 15:
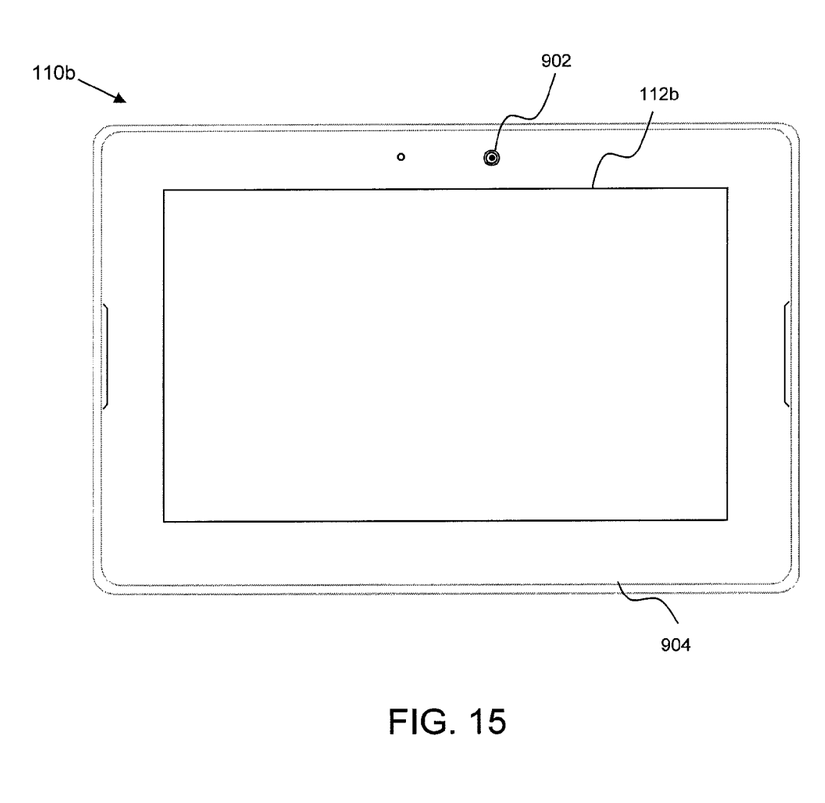

Referring to FIGS. 14 and 15, one example embodiment of an electronic device 110*a* is shown in FIG. 14 and another example embodiment of an electronic device 110*b* is shown in FIG. 15. It will be appreciated that the numeral "110" will hereinafter refer to any electronic device 110, including the example embodiments 110*a* and 110*b*, those example embodiments enumerated above or otherwise. It will also be appreciated that a similar numbering convention may be used for other general features common between all figures such as a touch-screen display 102.

The electronic device 110*a* shown in FIG. 14 includes a touch-screen display 102*a* and a cursor or positioning device, which in this example is in the form of a track pad 814*a*. Track pad 814*a* permits multi-directional positioning of a selection cursor 8 such that the selection cursor can be moved in an upward direction, in a downward direction and, if desired and/or permitted, in any diagonal direction. The track pad 814*a* in this example embodiment is situated on the front face of a housing for electronic device 110*a* as shown in FIG. 14 to enable a user to manoeuvre the track pad 814*a* while holding the electronic device 110*a* in one hand. The track pad 814*a* may serve as another input member (in addition to a directional or positioning member) to provide selection inputs to the processor 1002 (see FIG. 16) and can preferably be pressed in a direction towards the housing of the electronic device 110*b* to provide such a selection input. It will be appreciated that the track pad 814*a* is only one example embodiment of a suitable positioning device. For example, a track ball, touch-screen display, optical track pad, or other input mechanism may equally apply.

The touch-screen display 112*a* may display a selection cursor that depicts generally where the next input or selection will be received. The selection cursor may include a box, alteration of an icon or any combination of features that enable the user to identify the currently chosen icon or item. The electronic device 110*a* in FIG. 14 also includes a programmable convenience button 815*a* to activate a selection application such as, for example, a calendar or calculator. Further, electronic device 110*a* also includes an escape or cancel button 816*a*, a camera button 817*a*, a menu or option button 824*a* and a keyboard 820*a*. The camera button 817*a* is able to activate photo and video capturing functions, e.g. when pressed in a direction towards the housing. The menu or option button 824a can be used to load a menu or list of options on the display 112a when pressed. In this example embodiment, the escape or cancel button 816a, the menu option button 824a, and a keyboard 820a are disposed on the front face of the electronic device housing, while the convenience button 815a and camera button 817a are disposed at the side of the housing. This button placement enables a user to operate these buttons while holding the electronic device 110a in one hand. The keyboard 820a is, in this example embodiment, a standard QWERTY keyboard, however, it will be appreciated that reduced QWERTY or virtual keyboards (e.g. as provided by a touch-screen display) may equally apply The example electronic device 110b shown in FIG. 15 includes a touch-screen display 112b, a front camera 902, and a touch-sensitive frame 904. The touch-screen display 112b serves as the position device to provide an input mechanism in addition to display capabilities. The touch-sensitive frame also provides another input mechanism, for example, to control menu options of the electronic device 110b.

It will be appreciated that for the electronic device 110, a wide range of one or more positioning or cursor/view positioning mechanisms such as a touch/track pad, a positioning wheel, a joystick button, a mouse, a touch-screen, a set of arrow keys, a tablet, an accelerometer (for sensing orientation and/or movements of the electronic device 110 etc.), OLED, or other whether presently known or unknown may be employed. Similarly, any variation of keyboard 820 may be used. It will also be appreciated that the electronic devices 110 shown in FIGS. 14 and 15 are for illustrative purposes only and various other electronic devices 110 are equally applicable to the following example embodiments. Other buttons may also be disposed on the electronic device housing such as colour coded "Answer" and "Ignore" buttons to be used in telephonic communications.

To aid the reader in understanding the structure of the electronic device 110, reference will now be made to FIG. 16.

FIG. 16, shows therein is a block diagram of an example embodiment of an electronic device 110. The electronic device 110 includes a number of components such as a main processor 1002 that controls the overall operation of the electronic device 110. Main processor 1002 is directly or indirectly connected to the components of the electronic device 110, as shown in FIG. 16. Communication functions, including data and voice communications, are performed through a communication subsystem 1004. The communication subsystem 1004 receives messages from and sends messages to a wireless network 502. In this example embodiment of the electronic device 110, the communication subsystem 1004 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the example embodiments described herein are intended to use any other suitable standards that are developed in the future. The wireless link connecting the communication subsystem 1004 with the wireless network 1002 represents one or more different Radio Frequency (RF) channels, operating according to defined protocols specified for GSM/GPRS communications.

The main processor 1002 is also communicatively connected to and interacts with additional subsystems such as a Random Access Memory (RAM) 1006, a flash memory 1008, a touch-screen display 1010, an auxiliary input/output (I/O) subsystem 1012, a data port 1014, a keyboard 1016, a speaker 1018, a microphone 1020, a GPS receiver 1021, short-range communications 1022, a camera 1023, a accelerometer 1025 and other device subsystems 1024. Some of the subsystems of the electronic device 110 perform communication-related functions, whereas other subsystems may provide "resident" or on-device functions. By way of example, the display 1010 and the keyboard 1016 may be used for both communication-related functions, such as entering a text message for transmission over the network 1002, and device-resident functions such as a calculator or task list.

The electronic device 110 can send and receive communication signals over the wireless network 1002 after required network registration or activation procedures have been completed. Network access is associated with a subscriber or user of the electronic device 110. To identify a subscriber, the electronic device 110 may use a subscriber module component or "smart card" 1026, such as a Subscriber Identity Module (SIM), a Removable User Identity Module (RUIM) and a Universal Subscriber Identity Module (USIM). In the example embodiment shown, a SIM/RUIM/USIM 1026 is to be inserted into a SIM/RUIM/USIM interface 1028 in order to communicate with a network. Without the component 1026, the electronic device 110 is not fully operational for communication with the wireless network 1002. Once the SIM/RUIM/USIM 1026 is inserted into the SIM/RUIM/USIM interface 1028, it is connected to the main processor 1002.

The electronic device 110 is typically a battery-powered device and includes a battery interface 1032 for receiving one or more rechargeable batteries 1030. In at least some example embodiments, the battery 1030 can be a smart battery with an embedded microprocessor. The battery interface 1032 is coupled to a regulator (not shown), which assists the battery 1030 in providing power to the electronic device 110. Although current technology makes use of a battery, future technologies such as micro fuel cells may provide the power to the electronic device 110.

The electronic device 110 also includes an operating system 1034 and software applications and components 1036. The operating system 1034 and the software applications and components 1036 that are executed by and configure the main processor 1002 are typically stored in a persistent store such as the flash memory 1008, which may alternatively be a read-only memory (ROM) or similar storage element (not shown). Those skilled in the art will appreciate that portions of the operating system 1034 and the software applications and components 1036, such as specific device applications, or parts thereof, may be temporarily loaded into a volatile store such as the RAM 1006. Other software components can also be included, as is well known to those skilled in the art.

The subset of software applications 1036 that control basic device operations, including data and voice communication applications, may be installed on the electronic device 110 during its manufacture. Software applications may include a message application 1038, a map application 1039, a personal information manager (PIM) application 1040, image processing software 1041, character recognition software 1042, a connect software component 1043 and other software components 1044. A message application 1038 can be any suitable software program that allows a user of the electronic device 110 to send and receive electronic messages, wherein messages are typically stored in the flash memory 1008 of the electronic device 110. A PIM application 1040 includes functionality for organizing and managing data items of interest to the user, such as, but not limited to, e-mail, contacts, calendar events, and voice mails, and may interact with the wireless network 1002. Image processing software 1041 can implement the image processing method 600 of FIG. 6. Character recognition software 1042 can implement the scanning method 700 of FIG. 7. A connect software component 1043 implements the communication protocols that are required for the electronic device 110 to communicate with the wireless infrastructure and any host system, such as an enterprise system, that the electronic device 110 is authorized to interface with.

Other types of software applications or components 1044 can also be installed on the electronic device 110. These software applications 1044 can be pre-installed applications (i.e. other than message application 1038) or third party applications, which are added after the manufacture of the electronic device 110. Examples of third party applications include games, calculators, utilities, etc.

The additional applications 1044 can be loaded onto the electronic device 110 through at least one of the wireless network 1002, the auxiliary I/O subsystem 1012, the data port 1014, the short-range communications subsystem 1022, or any other suitable device subsystem 1024.

The data port 1014 can be any suitable port that enables data communication between the electronic device 110 and another computing device. The data port 1014 can be a serial or a parallel port. In some instances, the data port 1014 can be a USB port that includes data lines for data transfer and a supply line that can provide a charging current to charge the battery 1030 of the electronic device 110.

For voice communications, received signals are output to the speaker 1018, and signals for transmission are generated by the microphone 1020. Although voice or audio signal output is accomplished primarily through the speaker 1018, the display 1010 can also be used to provide additional information such as the identity of a calling party, duration of a voice call, or other voice call related information.

It will be appreciated that any module or component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 110 or accessible or connectable thereto. Any application or module herein described may be implemented using computer readable/executable instructions or operations that may be stored or otherwise held by such computer readable media.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above has been described with reference to certain specific example embodiments, various modifications thereof will be apparent to those skilled in the art as outlined in the appended claims.

The invention claimed is:

1. A method performed by an electronic device, comprising:
   obtaining an image;
   applying to the image at least one image processing technique;
   scanning the image to identify a text item;
   determining an item type for the identified text item; and
   determining an action, corresponding to the item type.

2. The method of claim 1, further comprising:
   displaying a user interface element, corresponding to the action;
   receiving a selection of the user interface element; and
   performing the action.

3. The method of claim 1, wherein the at least one image processing technique comprises:
   boosting contrast in the image, to bring out potential text items; and
   drawing rectangles around the potential text items.

4. The method of claim 1, wherein the at least one image processing technique comprises:
   performing thresholding on the image, to bring out potential text items; and
   drawing rectangles around the potential text items.

5. The method of claim 3, further comprising:
   determining boundaries for each of the rectangles; and
   combining overlapping rectangles, to form larger rectangles.

6. The method of claim 3, wherein the scanning of the image, comprises scanning the rectangles for any text items.

7. The method of claim 6, further comprising:
   assigning a confidence score to each scan; and
   discarding any scans with a low confidence score.

8. The method of claim 7, further comprising correcting any misspellings in the text items.

9. The method of claim 7, further comprising discarding any text items that do not meet at least one predetermined criterion.

10. The method of claim 1, wherein the image is obtained from a frame of a video.

11. An electronic device to perform an action based on scanned text, comprising:
    a display; and
    a processor configured to:
       obtain an image;
       apply to the image at least one image processing technique;
       scan the image to identify a text item;
       determine an item type for the identified text item; and
       determine an action, corresponding to the item type.

12. The electronic device of claim 11, wherein the processor is further configured to:
    display a user interface element, corresponding to the action;
    receive a selection of the user interface element; and
    perform the action.

13. The electronic device of claim 11, wherein the at least one image processing technique comprises:
- boosting contrast in the image, to bring out potential text items; and
- drawing rectangles around the potential text items.

14. The electronic device of claim 11, wherein the at least one image processing technique comprises:
- performing thresholding on the image, to bring out potential text items; and
- drawing rectangles around the potential text items.

15. The electronic device of claim 13, wherein the processor is further configured to:
- determine boundaries for each of the rectangles; and
- combine overlapping rectangles, to form larger rectangles.

16. The electronic device of claim 13, wherein the scanning of the image, comprises scanning the rectangles for any text items.

17. The electronic device of claim 16, wherein the processor is further configured to:
- assign a confidence score to each scan; and
- discard any scans with a low confidence score.

18. The electronic device of claim 16, wherein the processor is further configured to correct any misspellings in the text items.

19. The electronic device of claim 16, wherein the processor is further configured to discard any text items that do not meet at least one predetermined criterion.

20. The electronic device of claim 11, wherein the image is obtained from a frame of a video.

21. A computer readable storage medium comprising computer executable instructions to perform an action based on scanned text, comprising:
- obtaining an image;
- applying to the image at least one image processing technique;
- scanning the image to identify a text item;
- determining an item type for the identified text item; and
- determining an action, corresponding to the item type.

\* \* \* \* \*